UNITED STATES PATENT OFFICE.

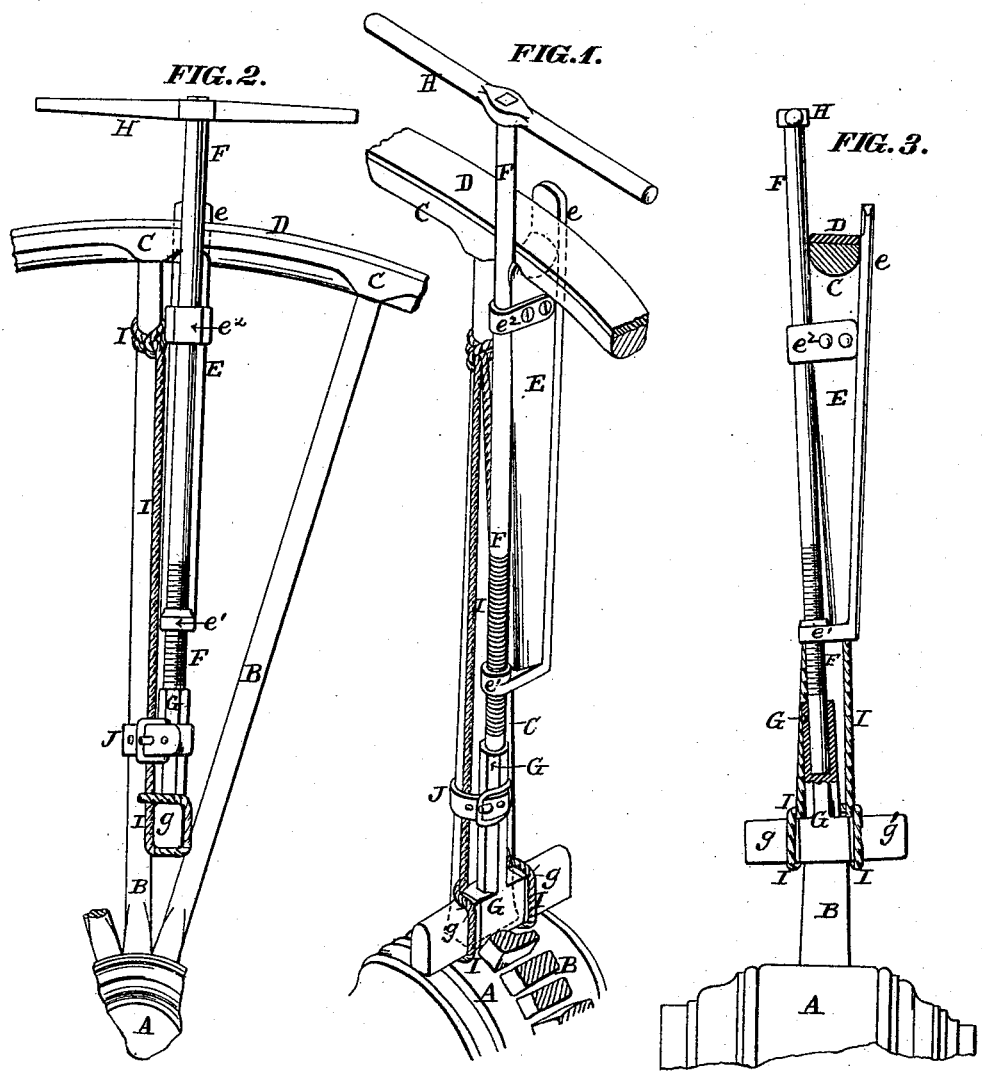

JOHN W. MARKS, OF SUMNER, ILLINOIS.

IMPROVEMENT IN TIRE-TIGHTENERS.

Specification forming part of Letters Patent No. 169,014, dated October 19, 1875; application filed May 10, 1875.

*To all whom it may concern:*

Be it known that I, JOHN W. MARKS, of Sumner, Lawrence county, State of Illinois, have invented a certain Improvement in Tire-Tighteners, of which the following is a specification:

My invention relates to improvements in tire-tighteners; and consists in the employment of a rope having formed at its lower end a sling for looping around the spoke and cross-foot of the socket, for the purpose of holding the same securely while being tightened.

Figure 1 is a perspective view; Fig. 2, a side elevation; Fig. 3, end elevation, partly in section.

A is the wheel-hub; B, the spokes. C is the rim, composed of fellies; D, the tire; E, the jack, whose outer end $e$ is formed to engage beneath the rim in the manner of a crutch. F is the jack-screw, which turns in a screw-threaded ear or lug, $e^1$, and in a strap-loop, $e^2$, of the jack. G is the socket in which the inner end of the jack-screw has bearing, so as to turn freely therein. The jack-screw is turned by a cross-handle, H, at its outer end. I is a sling of rope, looped around the spoke, and around the cross-foot $g$ of the socket. The cross-foot $g$ rests between the spokes.

The manner of using the device is as follows: When the spokes of a wheel are loose in the hub the rope I is tightly looped around the spoke very near the rim. Leather may be put beneath the rope, to prevent injury to the paint or varnish. The lower end of the rope is then looped around the socket-foot $g$, and the lower end of the screw-rod inserted in the socket, with the upper end of the lifting-jack adjusted under the felly about one inch from the spoke to be operated on.

A strap or cord, J, should be placed around the socket and spoke, to prevent the socket from swinging from its appropriate position during the operation.

The jack being thus properly adjusted, it is raised by turning the screw-rod, and consequently the felly is pressed from the shoulder of the spoke and out against the tire, when a washer of leather or any other suitable material is adjusted around the tenon of the spoke. The jack is then removed, and sufficient hammering applied to the tire over the spoke to fix the felly tightly on the washer and the spoke in the hub. Other spokes are then treated in like manner, and so on until the tire is sufficiently tight.

By the use of the rope the spoke is held firmly in the hub, and at the same time the felly is raised, so as to admit of the insertion of the washer between it and the shoulder of the spoke.

In cases where the spokes are firmly fixed in the hub the rope sling I may be dispensed with entirely, as the socket G in such case can rest between the spokes, or on the hub outside them.

My improvement is important, as providing a means for the timely tightening of the tire in a few minutes without danger of injury, thus avoiding the necessity of doing without the use of the vehicle while waiting at the blacksmith's for the tires to be cut and taken up; and it avoids the danger of injury to the wheel from the tire being made somewhat too short. It gives so ready a means for the adjustment of the wheel that it is not necessary at any time to run a wheel with a loose tire, which is injurious to the wheels from working the joints of the spokes loose in the hub and rims.

This device also provides a ready means for loosening up the wheels in wet weather, the rim being jacked out and a few washers taken out.

I claim as my invention—

The combination, with jack E, screw F, and socket G, of the rope sling I, for looping around the spoke and cross-foot $g$ of the socket, substantially as set forth.

JOHN W. MARKS.

Witnesses:
SAML. KNIGHT,
ROBERT BURNS.